United States Patent
Stenquist

(10) Patent No.: US 8,165,560 B2
(45) Date of Patent: Apr. 24, 2012

(54) SYSTEM AND METHOD FOR PROVIDING DATA TO AN EMERGENCY CALL CENTER

(75) Inventor: Anna Stenquist, Stockholm (SE)

(73) Assignee: Sony Mobile Communications AB, Lund (SE)

( * ) Notice: Subject to any disclaimer, the term of this patent is extended or adjusted under 35 U.S.C. 154(b) by 775 days.

(21) Appl. No.: 12/194,636

(22) Filed: Aug. 20, 2008

(65) Prior Publication Data

US 2010/0048159 A1 Feb. 25, 2010

(51) Int. Cl.
- *H04M 11/04* (2006.01)
- *H04M 1/725* (2006.01)
- *H04M 3/42* (2006.01)
- *H04M 11/00* (2006.01)
- *H04W 24/00* (2009.01)
- *H04B 1/38* (2006.01)

(52) U.S. Cl. ............... 455/404.1; 455/412.1; 455/414.1; 455/456.6; 455/90.1; 455/404.2; 379/45; 379/106.02

(58) Field of Classification Search ............... 455/404.1, 455/404.2, 414.1, 414.3, 412.1, 456.1, 456.2, 455/456.3, 456.5, 456.6, 90.1; 379/45, 106.02
See application file for complete search history.

(56) References Cited

U.S. PATENT DOCUMENTS

| | | | |
|---|---|---|---|
| 5,873,040 A * | 2/1999 | Dunn et al. | 455/456.2 |
| 6,647,267 B1 | 11/2003 | Britt et al. | |
| 6,680,998 B1 * | 1/2004 | Bell et al. | 379/37 |
| 6,807,409 B1 * | 10/2004 | Davidson et al. | 455/406 |
| 7,212,111 B2 * | 5/2007 | Tupler et | 340/539.18 |
| 7,719,414 B1 * | 5/2010 | Smith et al. | 340/525 |
| 7,773,971 B1 * | 8/2010 | Barbeau | 455/406 |
| 2002/0027975 A1 * | 3/2002 | Oxley | 379/45 |
| 2002/0083192 A1 * | 6/2002 | Alisuag | 709/237 |
| 2003/0037065 A1 * | 2/2003 | Svab | 707/104.1 |
| 2003/0233254 A1 * | 12/2003 | Hamilton et al. | 705/2 |
| 2004/0024706 A1 * | 2/2004 | Leduc | 705/41 |

(Continued)

FOREIGN PATENT DOCUMENTS

DE 43 18 441 12/1994

(Continued)

OTHER PUBLICATIONS

International Search Report and the Written Opinion of the International Searching Authority for corresponding International Patent Application No. PCT/IB2009/000227 mailed May 14, 2009.

(Continued)

*Primary Examiner* — Marivelisse Santiago Cordero
*Assistant Examiner* — Mong-Thuy Tran
(74) *Attorney, Agent, or Firm* — Renner, Otto, Boisselle & Sklar, LLP

(57) ABSTRACT

Described are techniques for transmitting information from a calling device to an emergency call center upon the initiation of a call to the emergency call center. The techniques may involve the automatic transmission of data, such as image data captured with a camera, biological information, or a profile about a person. In one embodiment, an individual's profile includes data to access medical information stored by a server, such as data to access the medical information over data access restriction functions of the server. In other embodiments, the user may select a profile to transmit from plural profiles, or not to send a profile.

3 Claims, 2 Drawing Sheets

U.S. PATENT DOCUMENTS

| | | | | |
|---|---|---|---|---|
| 2004/0172069 | A1* | 9/2004 | Hakala | 607/5 |
| 2004/0203622 | A1* | 10/2004 | Esque et al. | 455/412.1 |
| 2004/0203879 | A1* | 10/2004 | Gardner et al. | 455/456.1 |
| 2005/0053209 | A1 | 3/2005 | D'Evelyn et al. | |
| 2008/0015903 | A1* | 1/2008 | Rodgers | 705/3 |
| 2008/0071577 | A1* | 3/2008 | Highley | 705/3 |
| 2008/0126417 | A1* | 5/2008 | Mazurik | 707/104.1 |
| 2008/0188198 | A1* | 8/2008 | Patel et al. | 455/404.2 |
| 2008/0312962 | A1* | 12/2008 | Kirkwood | 705/2 |
| 2009/0136006 | A1* | 5/2009 | Milton et al. | 379/45 |
| 2009/0214000 | A1* | 8/2009 | Patel et al. | 379/45 |
| 2010/0023528 | A1* | 1/2010 | Cion | 707/10 |

FOREIGN PATENT DOCUMENTS

| | | |
|---|---|---|
| DE | 100 61 577 | 4/2002 |
| WO | 97/23104 | 6/1997 |

OTHER PUBLICATIONS

Cutler, Kim-Mai, "Future 911, Technology is changing so quickly that emergency communication systems are struggling to keep pace", The Boston Globe, (Jul. 24, 2006), [retrieved online], <http://www.boston.com/business/technology/articles/2006/07/24/future_911/>.

"Rising to the FCC challenge-implementing FCC's wireless 911 and enhanced 911 regulations—includes related article on 911 and E911 products—Industry Trend or Event", Communication News, (May 1997), [retrieved online], <http://209.82.141.104/search?q_cache:o6TcqUhT6P4J:findarticles.com/p/articles/mi_m0C...>.

"GeoConex Next-Generation Ready (NG) 911 Computer Aided Dispatch (CAD)", (2007) [retrieved online], <http://www.geoconex.com/Products/Dispatch/NG911CAD/tabid/57/Default.aspx>.

Hixson, Roger, et al., "911 The Next Generation, NENA's Blueprint Steers 9-1-1 Into the Future", 9-1-1 Magazine, (Jan./Feb. 2007), pp. 18-21.

"Intelligent Transportation Systems", Research and Innovative Technology Administration (RITA), U.S. Department of Transportation, (Jun. 12, 2008), [retrieved online], <http://www.its.dot.gov/ng911/ng911_future.htm.

"Next Generation 9-1-1", Dispatch Monthly Magazine, [retrieved online], http://www.911dispatch.com/911/nextgen_911.html.

International Preliminary Report on Patentability from corresponding International Application No. PCT/IB09/000227.

* cited by examiner

SYSTEM AND METHOD FOR PROVIDING DATA TO AN EMERGENCY CALL CENTER

TECHNICAL FIELD OF THE INVENTION

The technology of the present disclosure relates generally to communications with an emergency call center and, more particularly, to a system and method for providing data to an emergency call center.

BACKGROUND

During an emergency situation, emergency responders can best provide assistance to an injured or sick person when the emergency responders have information about the person. But communication between a caller and an emergency call center is historically limited to information that the caller orally conveys. In the United States, there has been an effort to add data receipt capability to emergency call centers under the proposed "next generation 911" emergency call system. Even still, there is room for improvement in what types of information is conveyed to the emergency call center and how the information is conveyed and/or retrieved by the emergency call center.

SUMMARY

To enhance the conveyance of information to emergency call centers, the present disclosure describes improved techniques for transmitting information from a calling device to an emergency call center.

According to one aspect of the disclosure, a first method of providing information to an emergency call center includes initiating a call with an electronic device to the emergency call center; and automatically transmitting a profile with information about a person to the emergency call center, the profile including at least one of bibliographic information, contact information for another person, medical history information, or data to access medical information stored by a server, and wherein the profile is transmitted as one of an electronic mail message, a text message, or a multimedia message.

According to one embodiment of the first method, the data to access medical information stored by a server includes a network or Internet address of the server.

According to one embodiment of the first method, the data to access medical information includes data to access the information over data access restriction functions of the server.

According to one embodiment of the first method, the profile further includes an activity log of communications transmitted or initiated using the electronic device.

According to one aspect of the disclosure, a second method of providing information to an emergency call center includes initiating a voice communication with an electronic device to the emergency call center and using an internet protocol; and automatically transmitting a profile with information about a person to the emergency call center, the profile including at least one of bibliographic information, contact information for another person, medical history information, or data to access medical information stored by a server, the transmission made as part of the communication.

According to one embodiment of the second method, the communication is a voice over internet protocol (VoIP) call made using IP multimedia subsystem.

According to one embodiment of the second method, data from a camera or a biometric device is transmitted as part of the communication.

According to one embodiment of the second method, the profile further includes an activity log of communications transmitted or initiated using the electronic device.

According to another aspect of the disclosure, a third method of providing information to an emergency call center includes initiating a communication with an electronic device to the emergency call center; and automatically transmitting a profile to the emergency call center, wherein the profile includes data to access medical information stored by a server.

According to one embodiment of the third method, the data to access medical information stored by a server includes a network or Internet address of the server.

According to one embodiment of the third method, the data to access medical information includes data to access the medical information over data access restriction functions of the server.

According to one embodiment of the third method, the profile further includes at least one of bibliographic information, contact information for another person, or medical history information.

According to one embodiment of the third method, the profile is transmitted as one of an electronic mail message, a text message, or a multimedia message.

According to another aspect of the disclosure, a fourth method of providing information to an emergency call center includes storing plural profiles with an electronic device, each profile including at least one of bibliographic information, contact information for another person, medical history information, or data to access medical information stored by a server; initiating a communication with an electronic device to the emergency call center; and transmitting a user selected one of the profiles to the emergency call center.

According to one embodiment of the fourth method, the user selected profile is transmitted as one of an electronic mail message, a text message, or a multimedia message.

According to another aspect of the disclosure, a fifth method of providing information to an emergency call center storing a profile with an electronic device, the profile including at least one of bibliographic information, contact information for another person, medical history information, or data to access medical information stored by a server; initiating a communication with an electronic device to the emergency call center; and querying a user to determine if the profile should be transmitted to the emergency call center.

According to one embodiment of the fifth method, the profile is not sent if the user answers the query in the negative.

According to one embodiment, the fifth method further includes transmitting the profile to the emergency call center if no user input in response to the query is received in a predetermined time period.

According to one embodiment of the fifth method, the data to access medical information includes data to access the information over data access restriction functions of the server.

According to another aspect of the disclosure, a sixth method of providing information to an emergency call center includes initiating a communication with an electronic device to the emergency call center; automatically activating a camera of the electronic device and capturing image data in the form of a photograph or a video with the camera; and transmitting the image data to the emergency call center.

According to one embodiment, the sixth method further includes transmitting a profile with information about a person to the emergency call center, the profile including at least one of bibliographic information, contact information for another person, medical history information, or data to access medical information stored by a server.

According to one embodiment of the sixth method, the camera is directed away from the user when the electronic device is held in a position to initiate the call.

According to another aspect of the disclosure, a seventh method of providing information to an emergency call center includes initiating a communication with an electronic device to the emergency call center; collecting biological data using a biometric device that is interfaced to the electronic device; and transmitting the biological data to the emergency call center with the electronic device.

According to one embodiment, the seventh method further includes transmitting a profile with information about a person to the emergency call center, the profile including at least one of bibliographic information, contact information for another person, medical history information, or data to access medical information stored by a server.

According to one embodiment of the seventh method, analysis of the biological data automatically prompts the initiation of the call.

According to one embodiment of the seventh method, the transmitted biological data includes data collected prior to initiation of the communication.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
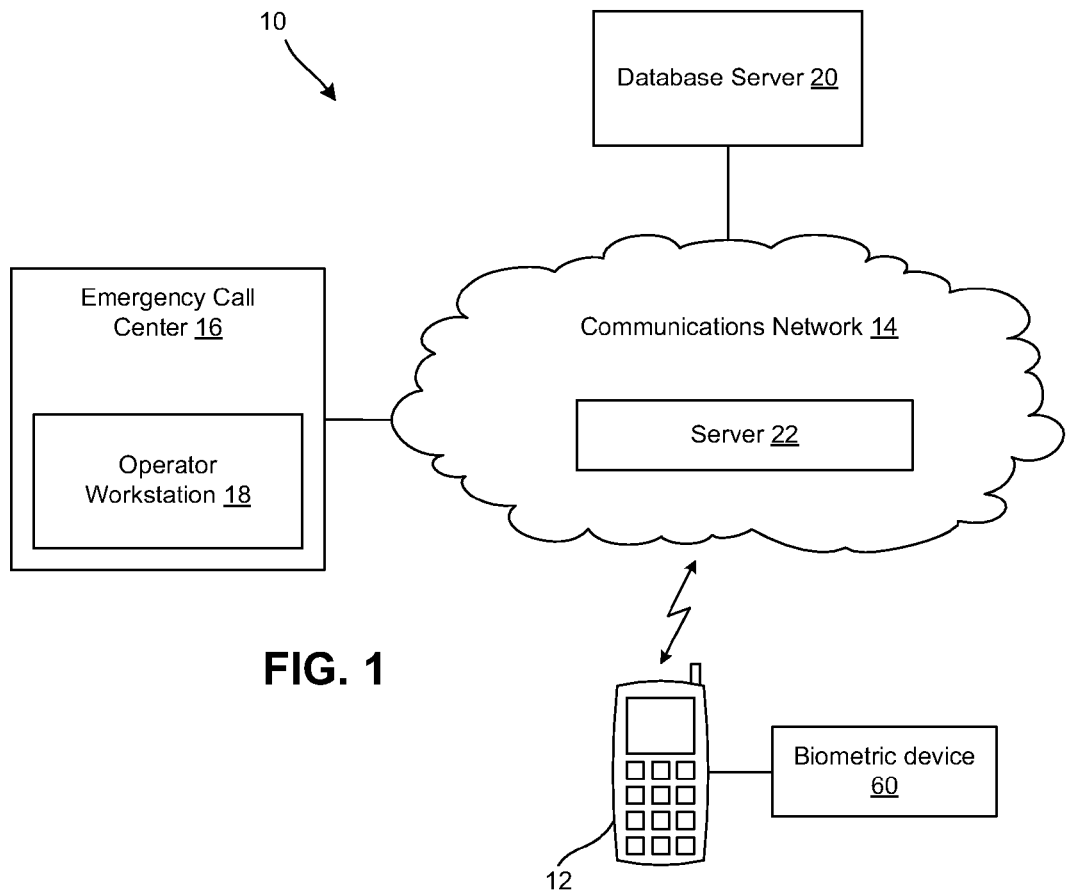
FIG. 1 is a schematic diagram of a communications system in which an electronic device, such as a mobile telephone, may operate.

Embodiments will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Referring initially to FIG. 1, a communications system 10 is illustrated. An electronic device 12 may operate in the communication system 10. The illustrated electronic device 12 is a mobile telephone. But, as indicated above, other types of electronic devices are possible, such as a computer. The electronic device 12 may communicate with other devices over a communications network 14. For instance, the electronic device 12 may be used to place a call to an emergency call center 16. The emergency call center 16 may include an operator workstation 18 that includes audio communications equipment 18 so that a human operator may speak with a user of the electronic device 12. Also, the operator workstation 18 may include a display for displaying information received from the electronic device 12 and/or other sources. The operator workstation 18 may be implemented with a general purpose computer, for example. Therefore, the operator workstation and/or other components of the emergency call center 16 may be configured as typical computer systems used to carry out emergency call center functions. These computing devices may include a processor configured to execute software containing logical instructions that embody the functions of the emergency call center 16 and a memory to store such software.

In some embodiments, a database server 20 may be accessible by the emergency call center 16 and/or the electronic device 12 over the network. As will be described, the database server 20 may store profile information related to the user of the electronic device 12 and/or other individuals. The database server 20 may be configured as a typical computer system used to carry out server functions and may include a processor configured to execute software containing logical instructions that embody the functions of the server 20 and a memory to store such software. The memory may be further used to store the profile information.

The communications network 14 may include a server 22 for managing calls placed by and destined to the electronic device 12, transmitting data to and receiving data from the electronic device 12 and carrying out any other support functions. The server 22 communicates with the electronic device 12 via a transmission medium. The transmission medium may be any appropriate device or assembly, including, for example, a communications base station (e.g., a cellular service tower, or "cell" tower), a wireless access point, a satellite, etc. The network 14 may support the communications activity of multiple electronic devices 12 and other types of end user devices. As will be appreciated, the server 22 may be configured as a typical computer system used to carry out server functions and may include a processor configured to execute software containing logical instructions that embody the functions of the server 22 and a memory to store such software.

Figure 2:
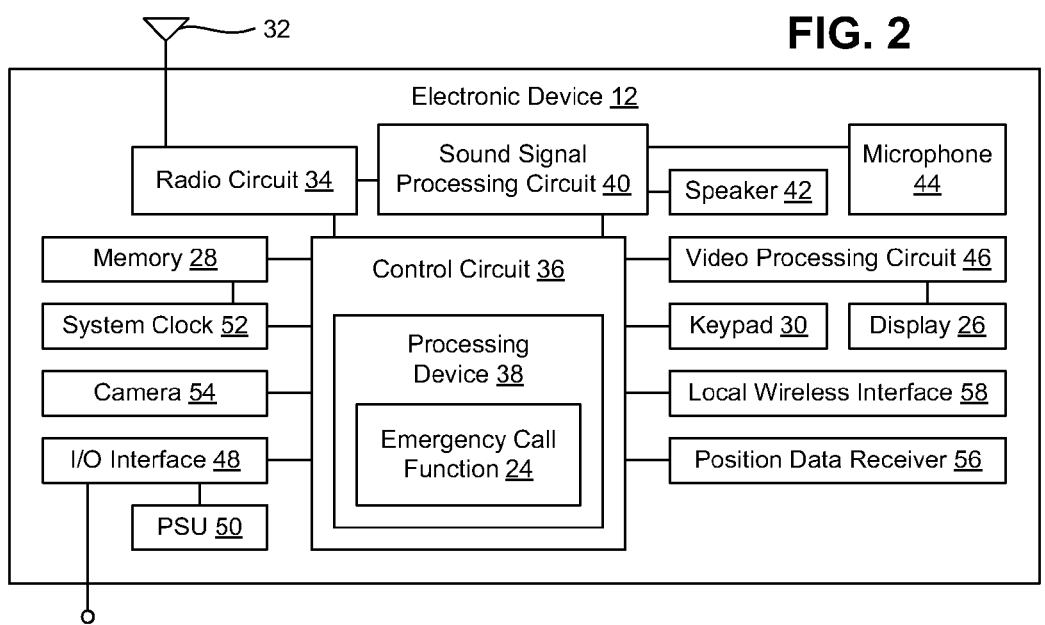
FIG. 2 is a schematic block diagram of an exemplary mobile telephone that may operate in the communications system of FIG. 1.

With additional reference to FIG. 2, the electronic device 12 may include an emergency call function 24 that is configured to automatically transmit data to the emergency call center 16 upon initiation of an emergency call. For instance, in the United States, emergency operators may be reached in most jurisdictions and using most telephone networks by dialing "9-1-1." As another example, emergency operators in Sweden may be reached by dialing "1-1-2." Additional details and operation of the emergency call function 24 will be described in greater detail below. The emergency call function 24 may be embodied as executable code that is resident in and executed by the electronic device 12. In one embodiment, the emergency call function 24 may be one or more programs that are stored on a computer or machine readable medium. The emergency call function 24 may be a stand-alone software application or form a part of a software application that carries out additional tasks related to the electronic device 12.

Also, through the following description, exemplary techniques for carrying out a method of providing data to an emergency call center are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered a logical routine that the corresponding device is configured to carry out. Also, while the emergency call function 24 is implemented in software in accordance with an embodiment, such functionality could also be carried out via dedicated hardware or firmware, or some combination of hardware, firmware and/or software.

The electronic device 12 may include a display 26. The display 26 displays information to a user such as operating state, time, telephone numbers, contact information, various menus, etc., that enable the user to utilize the various features of the electronic device 12. The display 26 also may be used to visually display content received by the electronic device 12 and/or retrieved from a memory 28.

A keypad 30 provides for a variety of user input operations. For example, the keypad 30 may include alphanumeric keys for allowing entry of alphanumeric information (e.g., telephone numbers, phone lists, contact information, notes, text, etc.), special function keys (e.g., a call send and answer key, multimedia playback control keys, a camera shutter button, etc.), navigation and select keys or a pointing device, and so forth. Keys or key-like functionality also may be embodied as a touch screen associated with the display 26. Also, the display 26 and keypad 30 may be used in conjunction with one another to implement soft key functionality.

The electronic device 12 includes communications circuitry that enables the electronic device 12 to establish a communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call (also known as IP telephony) that is established over a packet-switched capability of a cellular network or over an alternative packet-switched network (e.g., a network compatible with IEEE 802.11, which is commonly referred to as WiFi or a network compatible with IEEE 802.16, which is commonly referred to as WiMAX), for example. Therefore, the communications network 14 may support one or more of these network configurations and/or additional types of network configurations. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, file transfers, etc.), receiving or sending messages (e.g., text messages, instant messages, electronic mail messages, multimedia messages), and so forth. This data may be processed by the electronic device 12, including storing the data in the memory 28, executing applications to allow user interaction with the data, displaying video and/or image content associated with the data, outputting audio sounds associated with the data, and so forth.

In the exemplary embodiment, the communications circuitry may include an antenna 32 coupled to a radio circuit 34. The radio circuit 34 includes a radio frequency transmitter and receiver for transmitting and receiving signals via the antenna 32. Radio circuit 34 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 12 may be capable of communicating using more than one standard. Therefore, the antenna 32 and the radio circuit 34 may represent one or more than one radio transceiver.

The electronic device 12 may include a primary control circuit 36 that is configured to carry out overall control of the functions and operations of the electronic device 12. The control circuit 36 may include a processing device 38, such as a central processing unit (CPU), microcontroller or microprocessor. The processing device 38 executes code stored in a memory (not shown) within the control circuit 36 and/or in a separate memory, such as the memory 28, in order to carry out operation of the electronic device 12. For instance, the processing device 38 may execute code that implements the emergency call function 24. The memory 28 may be, for example, one or more of a buffer, a flash memory, a hard drive, a removable media, a volatile memory, a non-volatile memory, a random access memory (RAM), or other suitable device. In a typical arrangement, the memory 28 may include a non-volatile memory for long term data storage and a volatile memory that functions as system memory for the control circuit 36. The memory 28 may exchange data with the control circuit 36 over a data bus. Accompanying control lines and an address bus between the memory 28 and the control circuit 36 also may be present.

The electronic device 12 may further include a sound signal processing circuit 40 for processing audio signals transmitted by and received from the radio circuit 34. Coupled to the sound processing circuit 40 are a speaker 42 and a microphone 44 that enable a user to listen and speak via the electronic device 12. The radio circuit 34 and sound processing circuit 40 are each coupled to the control circuit 36 so as to carry out overall operation. Audio data may be passed from the control circuit 36 to the sound signal processing circuit 40 for playback to the user. The audio data may include, for example, audio data from an audio file stored by the memory 28 and retrieved by the control circuit 36, or received audio data such as in the form of voice communications or streaming audio data from a mobile radio service. The sound processing circuit 40 may include any appropriate buffers, decoders, amplifiers and so forth.

The display 26 may be coupled to the control circuit 36 by a video processing circuit 46 that converts video data to a video signal used to drive the display 26. The video processing circuit 46 may include any appropriate buffers, decoders, video data processors and so forth. The video data may be generated by the control circuit 36, retrieved from a video file that is stored in the memory 28, derived from an incoming video data stream that is received by the radio circuit 34 or obtained by any other suitable method.

The electronic device 12 may further include one or more input/output (I/O) interface(s) 48. The I/O interface(s) 48 may be in the form of typical mobile telephone I/O interfaces and may include one or more electrical connectors. The I/O interfaces 48 may form one or more data ports for connecting the electronic device 12 to another device (e.g., a computer) or an accessory (e.g., a personal handsfree (PHF) device) via a cable. Further, operating power may be received over the I/O interface(s) 48 and power to charge a battery of a power supply unit (PSU) 50 within the electronic device 12 may be received over the I/O interface(s) 48. The PSU 50 may supply power to operate the electronic device 12 in the absence of an external power source.

The electronic device 12 also may include various other components. For instance, a system clock 52 may clock components such as the control circuit 36 and the memory 28.

A camera 54 may be present for taking digital pictures and/or movies. Image and/or video files corresponding to the pictures and/or movies may be stored in the memory 28.

A position data receiver 56, such as a global positioning system (GPS) receiver, an assisted GPS (A-GPS) receiver, a Galileo satellite system receiver or the like, may be involved in determining the location of the electronic device 12.

A local wireless interface 58, such as an infrared transceiver and/or an RF transceiver (e.g., a Bluetooth chipset) may be used to establish wireless communication with a nearby device, such as an accessory (e.g., a PHF device), another mobile radio terminal, a computer or another device.

With continued reference to FIGS. 1 and 2, the electronic device 12 may interface with a biometric device 60. The interface may be established using an appropriate one of the I/O interfaces 48, the local wireless interface 56, or a network interface (e.g., WiFi). In other embodiments, the biometric device 60 may be an integral part of the electronic device 12. The biometric device 60 may be any device for monitoring a biological condition of a person. Therefore, exemplary biometric devices 60 include, but are not limited to, a heart rate monitor, an electrocardiogram (EKG) monitor, a blood pressure monitor, a pace maker that collects patient information, a blood sugar monitor, a breath rate monitor, a thermometer, or any other worn or implanted device. Another type of biometric device 60 may be a pedometer, also known as a hodometer, for counting steps taken by an individual. Information collected by a pedometer may be indicative of mental and/or physical state (e.g., an ill person may take no steps or very few steps, and an agitated or panicked person may take many steps). Also, collecting information with a pedometer may provide information about the whereabouts of a person relative to a last known location, such as if the individual went walking in the woods on a cold winter day.

Data from the biometric device 60 may be stored in a log. The log may contain data for a period of time before a call to an emergency call center is initiated (e.g., an hour, two hours, a day, a week, etc.). The amount of collected and logged data may be related to the type of data collected and the data collection frequency (e.g., temperature may be taken once an hour, but steps walked may be collected continuously). Data collection may continue during the call, or data collection may be commenced anew during the call. Also, data collection may continue after the call is completed. In other embodiments, data collection may commence when a call to an emergency call center is initiated.

Figure 3:
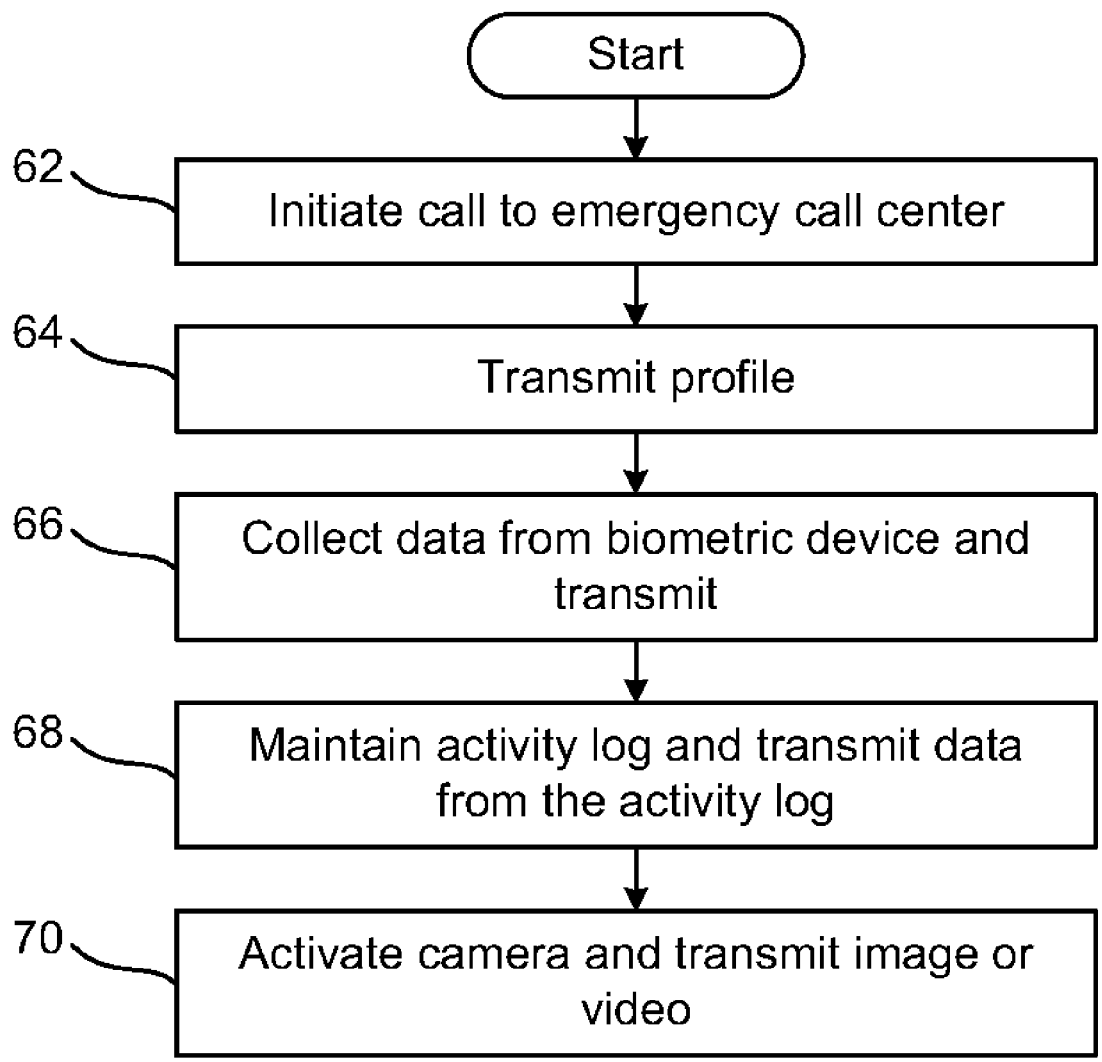
FIG. 3 is a flow chart representing an exemplary method of transmitting information to an emergency call center.

With additional reference to FIG. 3, illustrated are logical operations to implement an exemplary method of providing information to an emergency call center. The exemplary method may be carried out by executing an embodiment of the emergency call function 24, for example. Thus, the flow chart of FIG. 3 may be thought of as depicting steps of a method carried out by the electronic device 12. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted.

The logical flow for the emergency call function 24 may begin in block 62 where a call is initiated to the emergency call center 16. Typically, the call will be initiated by action of a user of the electronic device 12, such as by dialing an appropriate number sequence or selecting a number from a stored contact list entry. In other scenarios, the call may be automatically placed by the electronic device 12. For instance, if analysis of biological data from the biometric device 60 indicates an emergency condition, electronic device 12 may be configured to call the emergency call center 16 without user action.

In one embodiment, the call is a convention call over a circuit-switched network connection between the electronic device 12 and the network 14. In another embodiment, the call may be a VoIP (IP telephony) call over a packet-switched network connection between the electronic device 12 and the network 14. In this case, the call may be conducted using an internet protocol (IP) technique, such as a call using IP multimedia subsystem (IMS). In yet another embodiment, the electronic device 12 may communicate with the emergency call center 16 using a technique other than a call, such as an instant message (IM) session. Therefore, it will be appreciated that the initiation of a communication between the electronic device 12 and the emergency call center 16 may be a call or another communication technique.

Next, in block 64, a set of data may be transmitted to the emergency call center 16. The data may be transmitted in any appropriate form. In one example, the electronic device 12 may initiate a call and the data may be transmitted as an electronic mail message, a text message, a multimedia message, a message having a predetermined format appropriate for the equipment of the emergency call center, a file, or the like. In the case where a VoIP (IP telephone) call is made, the call may be made using IMS and the data may be transmitted in the same session interface protocol (SIP) session in which the call is set up. For instance, the data may be transmitted in a signaling layer of the interface or in a media layer of the interface (e.g., to support streaming of data, such as video, EKG information, pedometer data, etc.). This use of an IP interface may facilitate the handling of the call and of the data at the emergency call center 16 such that the call and the data are routed to the same operator workstation 18 for handling by the same individual. In the case of an IM session, data may be transmitted as part of the IM session in similar manner to the transmission of data using IMS.

The content of the data set that is transmitted to the emergency call center 16 may take any appropriate form. In one embodiment, the data set is a profile associated with the user of the electronic device. The profile may be generated in advance so that it is ready to be transmitted if the need for a call to the emergency call center arises.

The profile may contain one or more items of information. These items of information may include items that may be used to identify the individual (e.g., bibliographic information) and/or assist in contacting persons affiliated with the individual (e.g., family members or coworkers). The bibliographic information may include, but is not limited to, the name of the individual, date of birth, a residence and/or work address of the individual, one or more telephone numbers associated with the individual (e.g., a telephone number associated with the electronic device 12, a land-line telephone number for the individual's residence, an office telephone number, etc.), a personal identifying number (e.g., a social security number, driver's license number, etc.), insurance plan information, and so forth. The contact information for another person may include phone numbers and addresses of a person or persons that should be notified in case of an emergency involving the user of the electronic device. These persons may include, for example, parents, siblings, children, care takers, close friends, or the like.

Other information that may form part of the profile may be medical history information. The medical history information may include, but is not limited to, doctor or doctors that care for the individual with contact information for the doctor(s), preferred medical service providers (e.g., specified hospital facilities), medical conditions, detailed medical records, baseline medical data (e.g., a baseline EKG), prescription and/or non-prescription medicines taken by the individual, allergies to medications, foods and/or other items (e.g., bee stings), and so forth. The medical history information may be populated by the user. Alternatively, the medical history information may be acquired from a database maintained by the user's doctor or a database maintained by another organization. In one embodiment, the user may update the profile maintained by the electronic device 12 each time the user visits his or her doctor, such as through a synchronization routine or file sharing technique.

Other information that may form part of the profile is information to allow the operator of the operator workstation 18, or other emergency responder, to access information related to the user of the electronic device 12, but where the information is stored in the database server 20. Exemplary database servers 20 may be maintained by a hospital or doctor that treats the user, or may be maintained by a central authority that keeps medical records. In other embodiments, the database server 20 may be hosted by a commercial enterprise, an insurance company, or a public service enterprise to which the user subscribes. For example, the database server 20 may host an Internet website through which the user and/or treating medical professionals may maintain medical information related to the user. It is possible that the information transmitted to the emergency call center 16 may facilitate access to multiple database servers 20.

Information to access the database server 20 may include, but is not limited to, a network address of the database server 20, an Internet address (e.g., a uniform resource locator (URL) that identifies an Internet website), and so forth. In addition, the information to access user-related information from the database server 20 may include data to authorize access to the information over data access restriction functions (e.g., security functions, data protection functions, or data privacy functions). Authorization information may include, for example, a personal identification value (e.g., user name or number), a password, authorization code, security code, smart card data, biometric data (e.g., data from a previously collected fingerprint scan or retinal scan), etc.

The information to access the database server 20 may be presented to the operator of the operator workstation 18 for manual access to the appropriate records maintained by the database server 20. In another embodiment, the emergency call center 16 may automatically act upon the information so that the records maintained by the database server 20 are accessed and presented to the operator.

In some situations, the user of the electronic device 12 need not want all or part of the profile transmitted to the emergency call center 16. For instance, if the user witnesses a fire or a car accident and calls to report the event, the personal information of the user may be of little relevance to the emergency responders. Therefore, the user may be presented with an option to block the transmission of the profile. For instance, a menu option to send or not send the profile may appear on the display 26 when the call to the emergency call center 16 is initiated. In another embodiment, the profile may be transmitted after a predetermined period of time (e.g., about five to ten seconds after initiating the call), unless the user takes action to block the transmission.

It is also possible that the user of the electronic device 12 may be calling to report a medical emergency of another individual. For example, a parent may call to report an injury or illness of a child, or a care-taker may call the report an event associated with an elderly person. In these situations, the electronic device 12 may be used to store multiple profiles, such as the profile of the user as described above and similar profiles of others, such as family members, persons under the care of the user, etc. If multiple profiles are stored, then the user may be prompted to select one or more profiles for transmission when a call to the emergency call center 16 is initiated.

In another scenario, the user of the electronic device 12 may be calling to report a medical emergency of another individual and the caller has access to an electronic device associated with that individual (e.g., the mobile phone of the sick or injured individual). In that scenario, the user may initiate communication with the emergency call center 16, such as by starting an IM session, or calling the emergency call center 16 and also starting an IM session. The user may block the transmission of his or her own profile as described above. But the user may employ the electronic device of the sick or injured individual to join the IM session and transmit that person's profile, as stored by this second electronic device, to the emergency call center 16.

In addition to stored information, data acquired at the time of the call to the emergency call center 16 may be transmitted to the emergency call center 16. For instance, location information acquired using the position data receiver 54 may be transmitted to the emergency call center 16 in the form of GPS coordinates or a street address.

With continued reference to FIG. 3, in block 66, biological data may be acquired from the biometric device 60. The data may be transmitted to the emergency call center 16. These actions may be undertaken automatically, such as without user action other than commencing the call or completely without user action if the call to the emergency call center 16 is commenced by action of the electronic device 12. In this manner, emergency responders may be provided with information regarding the immediate medical condition of the person from whom the biometric device 60 collects biological information. As will be appreciated, data collected from the biometric device 60 prior to initiation of the call may be transmitted in the data transmission of block 66.

In another embodiment, and as shown in block 68, the electronic device 12 may store a log of activity involving the electronic device 12. The log may store, for example, data regarding communications (e.g., calls, text messages, multimedia messages, electronic mail messages, instant messages, etc.) initiated or sent using the electronic device 12. The stored data may be time of initiation or transmission, and recipient contact information. It is possible that the user may have conveyed information about how he or she felt in those communications. Therefore, the log of communications for a predetermined period of time before the call to the emergency call center 16 (e.g., the preceding hour) may be transmitted to the emergency call center 16. If appropriate, emergency personal may contact the persons to whom the user sent communications or called to attempt to gain relevant information for use in the care of the user.

In another embodiment, and as shown in block 70, the emergency call function 24 may automatically activate the camera 54. The camera 54 then may be automatically controlled to take one or more photos or to commence the taking of video. The photo(s) or video may be automatically transmitted to the emergency call center 16. As indicated, these actions may be undertaken automatically, such as without user action other than commencing the call or completely without user action if the call to the emergency call center 16 is commenced by action of the electronic device 12. In this manner, visual information about the user of the electronic device 12 and/or the surroundings of the user may be observed by the operator of the operator workstation 18. In one embodiment, the camera 54 may be a typical camera 54 for taking pictures or video with the electronic device 12. As will be appreciated, such a camera 54 is typically directed away from a user when the electronic device 12 is held in a position to make a call. In another embodiment, the camera 54 may be a camera that is directed toward the user, such as a camera used for video telephony.

Using the described techniques of providing information to an emergency call center 16, a profile of the user may be transmitted to the emergency call center 16. Among other information, the profile may contain medical conditions (e.g., a prior heart attack, asthma, allergies to medications, etc.). Details regard these medical conditions, such as relevant dates, medications taken and so forth may be supplied in the profile. If a call is placed to the emergency call center 16, the profile may be automatically transmitted so that the emergency operator has detailed information regarding the caller. Complete information may be difficult for the user to remember or articulate in a panic situation. As such, the described techniques reduce the need for the user to recall information and spend time informing the operator of the information. Also, contact information for a relative or other responsible person may be contained in the profile. This may be especially useful when the caller is a child or elderly person. Using the contact information, the emergency call center 16 may identify and contact the individuals identified in the profile. Not only is this process valuable to all interested parties, the knowledge that such profile information will be conveyed to the emergency call center may provide the user (and relatives of the user) peace of mind, even if the feature is not used due to lack of an emergency situation.

Although certain embodiments have been shown and described, it is understood that equivalents and modifications falling within the scope of the appended claims will occur to others who are skilled in the art upon the reading and understanding of this specification.

What is claimed is:

1. A method of providing information to an emergency call center, comprising:
    initiating a call with an electronic device to the emergency call center; and
    automatically transmitting a profile with information about a person to the emergency call center from the electronic device, the profile including at least one of bibliographic information, contact information for another person, or medical history information, and the profile further including data to access medical information stored by a server, the data to access medical information stored by a server includes a network or Internet address of the server and data to access the medical information by the emergency call center or an emergency responder over data access restriction functions of the server; and
    wherein the profile is transmitted as one of an electronic mail message, a text message, a multimedia message, or as part of an internet protocol call; and
    the profile further includes an activity log of communications transmitted or initiated using the electronic device within a predetermined period of time before initiation of the call to the emergency call center including calls, text messages and electronic mail messages.

2. The method of claim 1, wherein the call is a voice over internet protocol (VoIP) call made using IP multimedia subsystem.

3. The method of claim 1, wherein data from a camera or a biometric device is transmitted as part of the communication.

* * * * *